(12) United States Patent
Carpenter et al.

(10) Patent No.: US 7,555,639 B2
(45) Date of Patent: Jun. 30, 2009

(54) METHOD FOR CONFIGURING A DATA FORMATTING PROCESS USING CONFIGURATION VALUES OF A HIGHEST PRIORITY FOR EACH OF A NUMBER OF CONFIGURATION KEYS STORING IN SEVERAL CONFIGURATION LAYERS

(75) Inventors: Bryan F. Carpenter, Loveland, CO (US); Carli Connally, Fort Collins, CO (US); Reid Hayhow, La Porte, CO (US)

(73) Assignee: Verigy (Singapore) Pte. Ltd., Singapore (SG)

( * ) Notice: Subject to any disclaimer, the term of this patent is extended or adjusted under 35 U.S.C. 154(b) by 446 days.

(21) Appl. No.: 11/345,046

(22) Filed: Jan. 31, 2006

(65) Prior Publication Data

US 2007/0180222 A1 Aug. 2, 2007

(51) Int. Cl.
 *G06F 15/177* (2006.01)
(52) U.S. Cl. .................. 713/1; 702/108; 707/103 R
(58) Field of Classification Search .............. None
 See application file for complete search history.

(56) References Cited

U.S. PATENT DOCUMENTS

| | | | | |
|---|---|---|---|---|
| 5,796,750 A | * | 8/1998 | Lottridge et al. ............ | 714/725 |
| 5,953,684 A | * | 9/1999 | Alexander ................... | 702/108 |
| 6,333,932 B1 | * | 12/2001 | Kobayasi et al. ............ | 370/389 |
| 6,671,844 B1 | * | 12/2003 | Krech et al. ................. | 714/736 |
| 6,957,371 B2 | * | 10/2005 | Ricchetti et al. ............ | 714/733 |
| 7,158,907 B1 | * | 1/2007 | Soldo ......................... | 702/108 |
| 2007/0282556 A1 | * | 12/2007 | Achkar et al. ............... | 702/108 |

OTHER PUBLICATIONS

Joseph Czapski, "Useful Feature of Automated Test Systems in the R&D Laboratory", 2000, pp. 601-613.*

* cited by examiner

*Primary Examiner*—Chun Cao
(74) *Attorney, Agent, or Firm*—Holland & Hart, LLP

(57) ABSTRACT

In one embodiment, one or more data structures that define associations between a plurality of configuration keys and a plurality of configuration values are accessed, and a highest priority configuration value is retrieved for each of the plurality of configuration keys. The configuration values are stored in the data structure in one or more of a plurality of configuration layers, with each of the configuration layers conferring a priority to the configuration values stored therein. Configuration values for at least some of the configuration keys are simultaneously specifiable in multiple ones of the configuration layers. A data formatting process is configured in accord with the retrieved configuration values for the configuration keys. Other embodiments are also disclosed.

24 Claims, 2 Drawing Sheets

METHOD FOR CONFIGURING A DATA FORMATTING PROCESS USING CONFIGURATION VALUES OF A HIGHEST PRIORITY FOR EACH OF A NUMBER OF CONFIGURATION KEYS STORING IN SEVERAL CONFIGURATION LAYERS

BACKGROUND

Data formatting processes often need to be configured. Sometimes, configuration values are stored in numerous locations, and are managed by the different pieces of data formatting code that need to consume the configuration values. In other cases, some or all of a data formatting process' configuration values may be stored in a configuration file, and then retrieved from the configuration file.

SUMMARY OF THE INVENTION

In one embodiment, a method for configuring a data formatting process comprises 1) accessing one or more data structures that define associations between a plurality of configuration keys and a plurality of configuration values, and retrieving a highest priority configuration value for each of the plurality of configuration keys, and 2) configuring a data formatting process in accord with the retrieved configuration values for the configuration keys. The configuration values are stored in the data structure in one or more of a plurality of configuration layers, with each of the configuration layers conferring a priority to the configuration values stored therein. Configuration values for at least some of the configuration keys are simultaneously specifiable in multiple ones of the configuration layers.

In another embodiment, apparatus for configuring a data formatting process comprises computer readable media, and computer readable code that is stored on the computer readable media. The computer readable code may be configured to implement the method described in the preceding paragraph.

In yet another embodiment, apparatus for configuring a data formatting process comprises computer readable media, and computer readable code that is stored on the computer readable media. The computer readable code includes: 1) code defining a data formatting process; 2) code defining one or more data structures for storing configuration values for the data formatting process; 3) code to access the data structure and retrieve a highest priority configuration value for each of a plurality of configuration keys; and 4) code to configure the data formatting process in accord with the retrieved configuration values for the configuration keys. Ones of the configuration values stored in the data structure correspond to ones of the configuration keys, and are stored in one or more of a plurality of configuration layers. Each of the configuration layers confers a priority to the configuration values stored therein; and configuration values for at least some of the configuration keys are simultaneously specifiable in multiple ones of the configuration layers.

Other embodiments are also disclosed.

BRIEF DESCRIPTION OF THE DRAWINGS

Illustrative embodiments of the invention are illustrated in the drawings, in which.

DETAILED DESCRIPTION

Figures 1, 2:
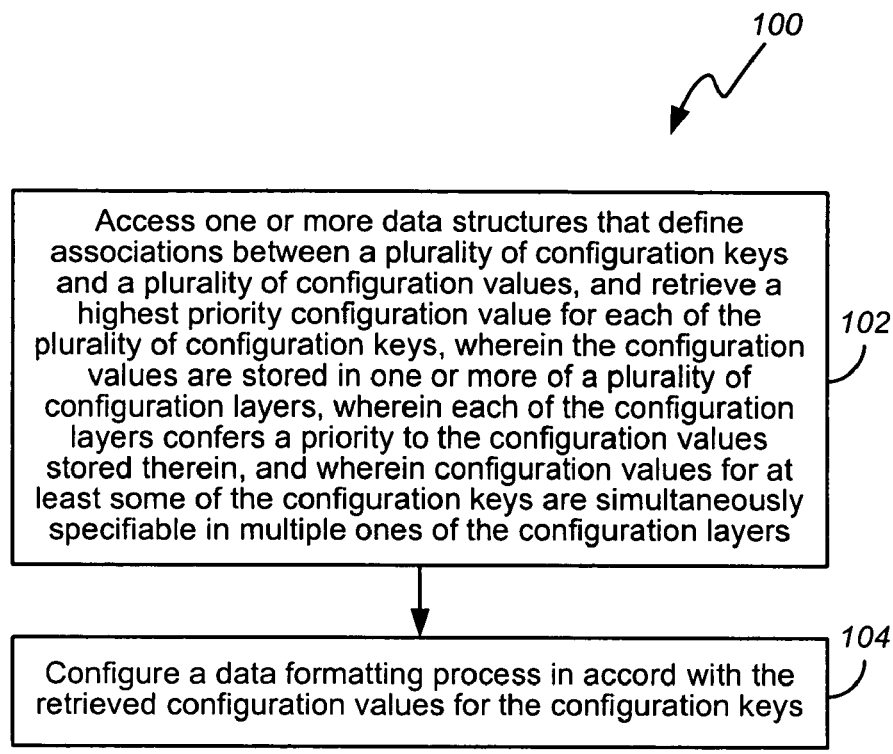
FIG. 1 illustrates an exemplary method for configuring a data formatting process.
FIG. 2 illustrates an exemplary embodiment of the data structure(s) accessed by the method shown in FIG. 1.

FIG. 1 illustrates an exemplary method 100 for configuring a data formatting process. The method 100 comprises accessing one or more data structures that define associations between a plurality of configuration keys and a plurality of configuration values, and retrieving a highest priority configuration value for each of the plurality of configuration keys (see block 102). During or after retrieval of the configuration values, a data formatting process is configured in accord with the retrieved configuration values (see block 104).

An exemplary embodiment of the data structure(s) accessed by the method 100 is shown in FIG. 2. As shown, the data structure(s) 200 comprise a plurality of configuration layers (i.e., two or more layers, such as layers 202, 204 and 206). Configuration values for a plurality of configuration keys (e.g., KEY1-KEY6) are stored in one or more of the plurality of layers 202, 204, 206. In some cases, configuration values for some or all of the configuration keys may be simultaneously specified in multiple ones of the configuration layers 202, 204, 206. See, for example, the two values (Val1$a$, Val1$c$) that are specified for KEY1, and the three values (Val6$a$, Val6$b$, Val6$c$) that are specified for KEY6. In other cases, configuration values for some of the configuration keys may be specified in only one of the configuration layers 202, 204, 206. See, for example, the value Val3$a$ that is specified for KEY3.

Preferably, a configuration value for each configuration key is specified in the data structure(s) 200. In this manner, upon access of the data structure(s) 200 via the method 100, a configuration value can be retrieved for each of the configuration keys (e.g., each of the keys KEY1-KEY6).

Each of the configuration layers 202, 204, 206 in the data structure(s) 200 confers a priority to the configuration values stored therein. By way of example, the default layer 202 shown in FIG. 2 may confer the lowest priority to its values (e.g., values Val1$a$, Val2$a$, Val3$a$, Val4$a$, Val5$a$, Val6$a$), with the test system layer 204 and the device under test (DUT) layer 206 conferring sequentially greater priorities to their respective values (e.g., values Val2$b$, Val4$b$, Val6$b$ in the system layer 204, and values Val1$c$, Val5$c$, Val6$c$ in the device layer 206). Thus, when the method 100 is used to access the data structure(s) 200 and retrieve values for the configuration keys (KEY1-KEY6), the method 100 may look to see if a value for a particular configuration key exists in the DUT layer 206; and, if no value is found, the method 100 may successively look to the test system layer 204, and then the default layer 202. If a value for a configuration key is found in a higher priority layer, the lower priority layer(s) need not be examined further. Alternately, the layers could be traversed in the opposite order, with values found in lower priority layers being discarded as corresponding values are found in higher priority layers.

By way of example, when the method 100 accesses the data structure 200 to retrieve values for the configuration keys KEY1-KEY6, the method 100 would retrieve the following "highest priority configuration values":

KEY1=Val1$c$
KEY2=Val2$b$
KEY3=Val3$a$
KEY4=Val4$b$
KEY5=Val5$c$
KEY6=Val6$c$

In one embodiment of the method 100, the values stored in the default layer 202 of the data structure(s) 200 may be determined by presets contained in data formatting software; the values stored in the test system layer 204 may be determined by presets provided for a test system; and the values stored in the DUT layer 206 may be determined by presets provided for a particular DUT. In other embodiments, some or all of the configuration values may be user-specifiable. However, it is preferable to preset at least some of the configuration values, to ensure that a configuration value will always exist for all configuration keys. In one embodiment, this may be accomplished by presetting configuration values for all configuration keys in a default layer (e.g., layer 202), and then allowing a user to specify different configuration values in higher priority layers (e.g., in the test system and DUT layers 204, 206).

Although a user may, in some cases, be granted authority to change default configuration values, this will typically not be preferred, unless the user is always forced to replace a default value (versus deleting it).

Figure 3:
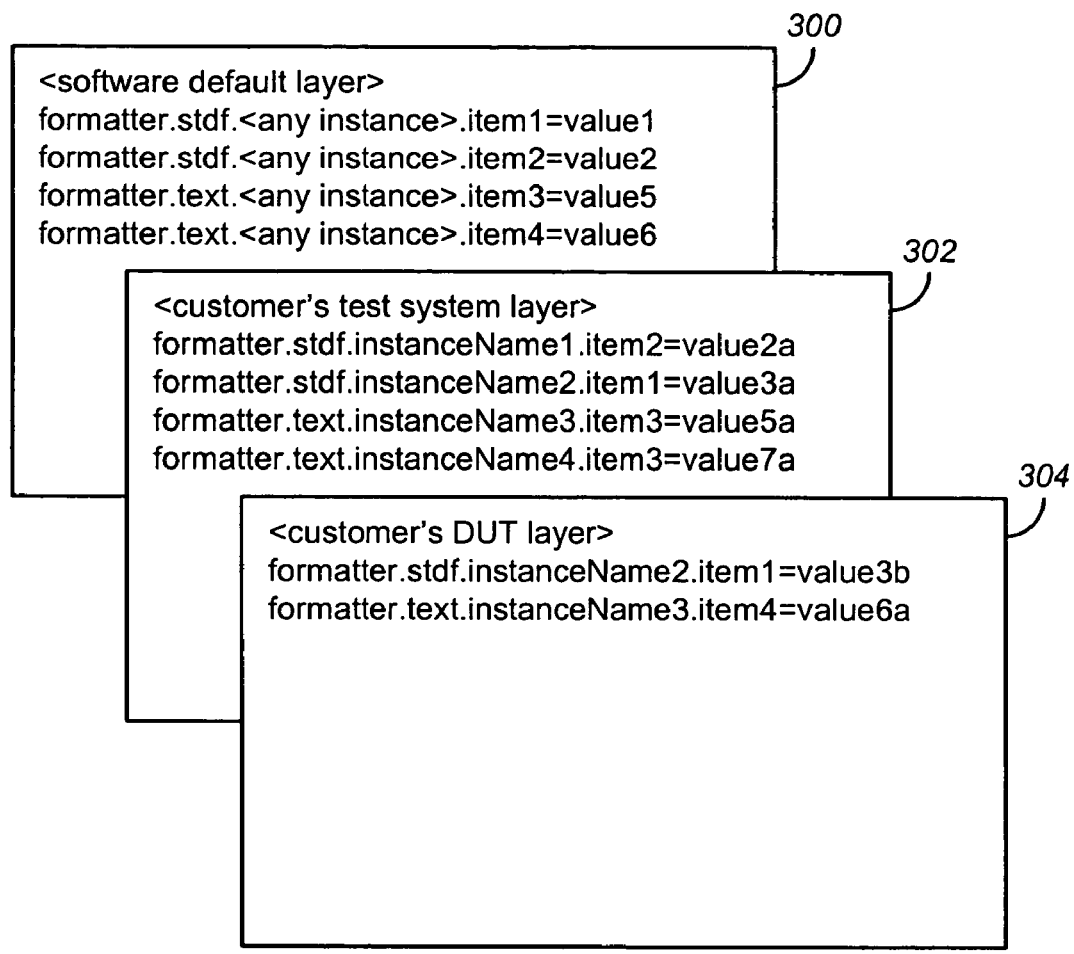
FIG. 3 illustrates an exemplary and useful way to store the configuration keys and configuration values shown in FIG. 2.

FIG. 3 illustrates a useful way to store configuration keys and their values. As shown, each of the layers 300, 302, 304 in which configuration values are stored is represented by a separate data structure, such as a separate configuration file. By way of example, FIG. 3 illustrates configuration files corresponding to a software default layer 300, a customer's test system layer 302 and a customer's DUT layer 304. Within each of these configuration files, configuration keys may be represented as tree structures (e.g., "key1=value1", "key1.key2=value2", "key1.key3=value3", "key1.key3.key4=value4").

Preferably, all of the configuration keys are represented as branches of a single "master" configuration tree structure. However, not all of the branches of the master configuration tree need be represented in each of the configuration files. That is, if no value is specified for a particular configuration key in a particular configuration layer 300, 302, 304, a branch representing the particular configuration key need not be included in the particular layer.

As shown in FIG. 3, multiple configuration tree branches may be referenced in a single line of a configuration file. For example, the line "formatter.stdf.<any instance>.item1=value1" in the "software default layer" 300 indicates that, when multiple STDF (Standard Test Data Format) formatters are employed in a circuit test environment, each of the STDF formatters should be configured using "value1" for its respective configuration key "item1". However, the line "formatter.stdf.instanceName2.item1=value3a" in the "customer's test system layer" 302 indicates that, for the STDF formatter named "instanceName2", the value of configuration key "item1" should be changed to "value3a" instead of "value1".

As the highest priority configuration values for each of a plurality of configuration keys are retrieved, they may be stored in a configuration file or in-memory configuration tree that mirrors the format of the various configuration files 300, 302, 304 shown in FIG. 3.

In one embodiment, the configuration keys are populated into an in-memory configuration tree as nodes of a deque. A deque (double-ended queue) is a data structure that unites the properties of a queue and a stack. Like a stack, items can be pushed into the deque. However, like a queue, the last item pushed into the deque can be extracted from one side of the deque, and the first item pushed into the deque can be extracted from the other side of the deque.

Preferably, the in-memory configuration tree is provided with a placeholder root node. In this manner, all configuration keys for all possible test systems, DUTs and other variables can be specified in a single configuration tree.

In one embodiment, the method 100 may be embodied in, and implemented by, computer readable code stored on computer readable media. The computer-readable media may include, for example, any number or mixture of fixed or removable media (such as one or more fixed disks, random access memories (RAMs), read-only memories (ROMs), or compact discs), at either a single location or distributed over a network. The computer readable code will typically comprise software, but could also comprise firmware or a programmed circuit.

In addition to code for performing the actions 102, 104 of the method 100, computer readable code that implements the method 100 may also comprise 1) code defining a data formatting process, 2) code defining the one or more data structures 200 that store configuration values for the data formatting process, and 3) code defining a user interface (e.g., a graphical user interface (GUI)) to receive some or all of the configuration values that are store in the data structures 200.

The methods and apparatus disclosed herein are useful in various contexts. However, they are especially useful in conjunction with a test data formatting process, including a circuit test data formatting process (such as a System-On-a-Chip (SOC) test data formatting process).

Depending on their implementation, the methods and apparatus disclosed herein can be useful because 1) they provide a flexible structure for storing configuration values, 2) they provide an easy means for specifying "default" configuration values, 3) the number of configuration layers may be more or less, and configuration layers may be easily swapped (e.g., as different DUTs are tested, the DUT layers 206, 304 may be replaced with the DUT layer corresponding to the device that is currently being tested).

What is claimed is:

1. A computer-implemented method for configuring a data formatting process, comprising:

accessing, in a configuration file or in-memory configuration tree, one or more data structures that define associations between a plurality of configuration keys and a plurality of configuration values, and retrieving a highest priority configuration value for each of the plurality of configuration keys, wherein the configuration values are stored in one or more of a plurality of configuration layers, wherein each of the configuration layers confers a priority to the configuration values stored therein, and wherein configuration values for at least some of the configuration keys are simultaneously specifiable in multiple ones of the configuration layers; and configuring a data formatting process of a computer in accord with the retrieved configuration values for the configuration keys.

2. The method of claim 1, wherein the configuration layers include a default layer, a test system layer and a device under test (DUT) layer, and wherein the default layer has a lower priority than the test system layer and the DUT layer.

3. The method of claim 2, wherein the test system layer has a lower priority than the DUT layer.

4. The method of claim 1, wherein the configuration layers include a default layer having a lowest priority of the configuration layers, the default layer storing a configuration value for each of the configuration keys.

5. The method of claim 1, wherein the data formatting process is a test data formatting process.

6. The method of claim 1, wherein the data formatting process is a system-on-a-chip (SOC) test data formatting process.

7. Apparatus for configuring a data formatting process, comprising:

computer readable media; and computer readable code, stored on the computer readable media, including, code to access one or more data structures that define associations between a plurality of configuration keys and a plurality of configuration values, and retrieving a highest priority configuration value for each of the plurality of configuration keys, wherein the configuration values are stored in one or more of a plurality of configuration layers, wherein each of the configuration layers confers a priority to the configuration values stored therein, and wherein configuration values for at least some of the configuration keys are simultaneously specifiable in multiple ones of the configuration layers; and code to configure a data formatting process in accord with the retrieved configuration values for the configuration keys.

8. The apparatus of claim 7, wherein the configuration layers include a default layer, a test system layer and a device under test (DUT) layer, and wherein the default layer has a lower priority than the test system layer and the DUT layer.

9. The apparatus of claim 8, wherein the test system layer has a lower priority than the DUT layer.

10. The apparatus of claim 7, wherein the configuration layers include a default layer having a lowest priority of the configuration layers, the default layer storing a configuration value for each of the configuration keys.

11. The apparatus of claim 7, wherein the configuration keys are tree structures.

12. The apparatus of claim 7, wherein the data formatting process is a test data formatting process.

13. The apparatus of claim 7, wherein the data formatting process is a system-on-a-chip (SOC) test data formatting process.

14. Apparatus for configuring a data formatting process, comprising:

computer readable media; and computer readable code, stored on the computer readable media, including, code defining a data formatting process;

code defining one or more data structures for storing configuration values for the data formatting process, wherein the configuration values correspond to a plurality of configuration keys, wherein the configuration values are stored in one or more of a plurality of configuration layers, wherein each of the configuration layers confers a priority to the configuration values stored therein, and wherein configuration values for at least some of the configuration keys are simultaneously specifiable in multiple ones of the configuration layers;

code to access the data structure and retrieve a highest priority configuration value for each of the plurality of configuration keys; and code to configure the data formatting process in accord with the retrieved configuration values for the configuration keys.

15. The apparatus of claim 14, wherein the configuration layers include a default layer, a test system layer and a device under test (DUT) layer, and wherein the default layer has a lower priority than the test system layer and the DUT layer.

16. The apparatus of claim 15, wherein the test system layer has a lower priority than the DUT layer.

17. The apparatus of claim 15, wherein configuration values stored in the default layer are not user-specifiable, and wherein at least some configuration values stored in configuration layers other than the default layer are user-specifiable.

18. The apparatus of claim 14, wherein the configuration layers include a default layer having a lowest priority of the configuration layers, the default layer storing a configuration value for each of the configuration keys.

19. The apparatus of claim 14, wherein the configuration keys are tree structures.

20. The apparatus of claim 19, wherein all of the configuration keys are branches of a single configuration tree structure.

21. The apparatus of claim 19, wherein the configuration keys are defined by nodes of a deque.

22. The apparatus of claim 14, wherein the computer readable code further comprises code defining a user interface to receive said configuration values.

23. The apparatus of claim 14, wherein the data formatting process is a test data formatting process.

24. The apparatus of claim 14, wherein the data formatting process is a system-on-a-chip (SOC) test data formatting process.

* * * * *